US008204738B2

(12) United States Patent
Skuratovsky

(10) Patent No.: US 8,204,738 B2
(45) Date of Patent: Jun. 19, 2012

(54) REMOVING BIAS FROM FEATURES CONTAINING OVERLAPPING EMBEDDED GRAMMARS IN A NATURAL LANGUAGE UNDERSTANDING SYSTEM

(75) Inventor: Ilya Skuratovsky, Stamford, CT (US)

(73) Assignee: Nuance Communications, Inc., Burlington, MA (US)

( * ) Notice: Subject to any disclaimer, the term of this patent is extended or adjusted under 35 U.S.C. 154(b) by 731 days.

(21) Appl. No.: 11/556,477

(22) Filed: Nov. 3, 2006

(65) Prior Publication Data

US 2008/0109210 A1    May 8, 2008

(51) Int. Cl.
G06F 17/27 (2006.01)
G06F 17/21 (2006.01)
G10L 15/06 (2006.01)
G10L 15/00 (2006.01)
G10L 21/00 (2006.01)

(52) U.S. Cl. ............. 704/9; 704/10; 704/236; 704/257; 704/270; 704/270.1; 704/275

(58) Field of Classification Search ................ 704/1–10, 704/257, 275, 270, 204, 236; 707/6
See application file for complete search history.

(56) References Cited

U.S. PATENT DOCUMENTS

| 5,410,475 | A * | 4/1995 | Lu et al. ............................ 704/1 |
| 5,613,036 | A * | 3/1997 | Strong ........................... 704/243 |
| 6,173,251 | B1 * | 1/2001 | Ito et al. ............................ 704/7 |
| 6,311,150 | B1 * | 10/2001 | Ramaswamy et al. ............. 704/1 |
| 6,356,869 | B1 * | 3/2002 | Chapados et al. ............. 704/275 |
| 6,434,524 | B1 * | 8/2002 | Weber ............................ 704/257 |
| 6,766,287 | B1 * | 7/2004 | Kupiec et al. ..................... 704/9 |
| 6,801,897 | B2 * | 10/2004 | Kist et al. ....................... 704/275 |
| 7,031,908 | B1 * | 4/2006 | Huang et al. ...................... 704/9 |
| 7,080,004 | B2 * | 7/2006 | Wang et al. ....................... 704/9 |
| 7,092,888 | B1 * | 8/2006 | McCarthy et al. ............. 704/277 |
| 7,099,809 | B2 * | 8/2006 | Dori ................................. 703/6 |
| 7,181,387 | B2 * | 2/2007 | Ju et al. ............................ 704/9 |
| 7,216,073 | B2 * | 5/2007 | Lavi et al. ......................... 704/9 |
| 7,440,895 | B1 * | 10/2008 | Miller et al. .................. 704/244 |
| 7,493,253 | B1 * | 2/2009 | Ceusters et al. .................. 704/9 |
| 2002/0042711 | A1 * | 4/2002 | Lin .............................. 704/257 |
| 2002/0138248 | A1 * | 9/2002 | Corston-Oliver et al. ........ 704/1 |

(Continued)

OTHER PUBLICATIONS

Baldi, S.; Marinai, S.; Soda, G.; , "Using tree-grammars for training set expansion in page classification," Document Analysis and Recognition, 2003. Proceedings. Seventh International Conference on , vol., No., pp. 829-833, Aug. 3-6, 2003.*

*Primary Examiner* — Douglas Godbold
*Assistant Examiner* — Edgar Guerra-Erazo
(74) *Attorney, Agent, or Firm* — Wolf, Greenfield & Sacks, P.C.

(57) ABSTRACT

A method of removing bias from an action classifier within a natural language understanding system can include identifying a sentence having a target embedded grammar that overlaps with at least one other embedded grammar and selecting a group of overlapping embedded grammars including the target embedded grammar and at least one additional embedded grammar. A sentence expansion can be created that includes the sentence including the target embedded grammar and a copy of the sentence for each additional embedded grammar of the group. Each copy of the sentence can include a different additional embedded grammar from the group in place of the target embedded grammar. The sentence expansion can be included within action classifier training data.

21 Claims, 4 Drawing Sheets

U.S. PATENT DOCUMENTS

| | | | |
|---|---|---|---|
| 2002/0169595 A1* | 11/2002 | Agichtein et al. | 704/9 |
| 2003/0050772 A1* | 3/2003 | Bennett | 704/9 |
| 2003/0055623 A1* | 3/2003 | Epstein et al. | 704/1 |
| 2003/0061029 A1* | 3/2003 | Shaket | 704/9 |
| 2003/0130849 A1* | 7/2003 | Durston et al. | 704/270 |
| 2003/0212544 A1* | 11/2003 | Acero et al. | 704/9 |
| 2003/0233222 A1 | 12/2003 | Soricut et al. | |
| 2004/0044515 A1* | 3/2004 | Metcalf et al. | 704/1 |
| 2004/0249628 A1* | 12/2004 | Chelba et al. | 704/4 |
| 2005/0075878 A1 | 4/2005 | Balchandran et al. | |
| 2005/0108001 A1 | 5/2005 | Aarskog | |
| 2005/0192992 A1* | 9/2005 | Reed et al. | 707/101 |
| 2006/0004567 A1 | 1/2006 | Russell | |
| 2006/0036596 A1 | 2/2006 | Zhang et al. | |
| 2006/0053000 A1 | 3/2006 | Moldovan et al. | |
| 2006/0074671 A1* | 4/2006 | Farmaner et al. | 704/257 |
| 2007/0156392 A1* | 7/2007 | Balchandran et al. | 704/9 |
| 2008/0162652 A1* | 7/2008 | True et al. | 709/206 |

\* cited by examiner

REMOVING BIAS FROM FEATURES CONTAINING OVERLAPPING EMBEDDED GRAMMARS IN A NATURAL LANGUAGE UNDERSTANDING SYSTEM

BACKGROUND OF THE INVENTION

Statistical language models (SLM) capture regularities of natural language for the purpose of improving the performance of various Natural Language Understanding (NLU) systems. The SLM attempts to provide a probability distribution of various linguistic units such as words, sentences, and the like. Some varieties of SLMs utilize embedded grammars to help process speech-recognized text. An embedded grammar, in general, is a grammar that is referenced and used by the SLM in processing speech-recognized text. Embedded grammars typically are crafted for a limited purpose, i.e., identifying numbers, cities, restaurants, etc.

In some cases, embedded grammars within an NLU system overlap with one another. That is, one or more of the embedded grammars specify one or more of the same values. In illustration, an embedded grammar for states can be said to be "overlapping" with an embedded grammar for cities if both include the value, or member, "New York". Another example is where two or more grammars include numerical values. An embedded grammar for temperatures, for instance, will likely include one or more of the same numerical values as an embedded grammar for humidity level.

Output from the SLM, which typically includes information such as the speech-recognized text and references to particular embedded grammars, can be provided to an action classifier. The action classifier creates a list of one or more possible tasks, or actions, based upon the received input. The actions or tasks represent an interpretation of what it is that the user wishes to do. In determining the action, the action classifier is biased, at least in part, according to the list of embedded grammars received from the SLM with the speech-recognized text.

Consider the sentence "make temperature 50 degrees" and the sentence "set humidity at 50 percent". The SLM would provide the following as output for each respective sentence "make temperature TEMPERATURE" and "set humidity at HUMIDITY percent". In this case, the SLM provides the correct disambiguation between TEMPERATURE and HUMIDITY for the word "50". The search tree of the SLM typically has a depth of 2 or 3 words. This means that the particular words that cause the SLM to disambiguate to the correct embedded grammar must be 1 or 2 words away from the target word, which is "50" in this case. Accordingly, tokens such as "temperature" and "humidity" are identified which allow the SLM to determine the proper context for each embedded grammar.

If the surrounding word context is not sufficient, the SLM may incorrectly disambiguate the overlapping embedded grammars. Consider the sentence "set the temperature value to 50", which, when processed, can result in an ambiguous situation. The surrounding 3 word context "value to 50" does not help the SLM in determining whether "50" should be resolved to a TEMPERATURE or a HUMIDITY embedded grammar. A similar situation arises in the sentence "set humidity level to 50". The surrounding 3 word context "level to 50" does not help to disambiguate whether "50" is a TEMPERATURE or HUMIDITY.

If the SLM makes an error in disambiguating the name of an embedded grammar, there is a reasonable probability that the action classifier will also produce an incorrect task or list of tasks. For example, the sentence "set the temperature value to 50" may be incorrectly interpreted by the SLM so that "50" is labeled HUMIDITY. The input to the action classifier would be, in that case, "set the temperature value to HUMIDITY", where the word "HUMIDITY" would bias the action classifier significantly toward an incorrect action dealing with humidity, such as "SET_HUMIDITY" rather than the correct action "SET_TEMPERATURE". Thus, in some cases, the incorrect embedded grammar can bias the action classifier toward an incorrect result.

BRIEF SUMMARY OF THE INVENTION

The present invention is directed to removing bias from an action classifier within a natural language understanding (NLU) system. One embodiment of the present invention can include a method of removing bias. The method can include identifying a sentence having a target embedded grammar that overlaps with at least one other embedded grammar. A group of overlapping embedded grammars including the target embedded grammar and at least one additional embedded grammar can be selected. A sentence expansion can be created that includes the sentence including the target embedded grammar and a copy of the sentence for each additional embedded grammar of the group. Each copy of the sentence can include a different additional embedded grammar from the group in place of the target embedded grammar. The sentence expansion can be included in action classifier training data.

Another embodiment of the present invention can include a method of removing bias from an action classifier within an NLU system including identifying sentences that include at least one target embedded grammar. For each identified sentence, a group of overlapping embedded grammars including the target embedded grammar and at least one additional embedded grammar can be selected and "n-1" copies of the sentence can be created where "n" is the total number of embedded grammars in the selected group. The target embedded grammar in each copy of the sentence can be replaced with a different one of the additional embedded grammars of the group. The original sentence including the target embedded grammar can remain intact. The method also can include including the sentence and the copies of the sentence within action classifier training data.

Yet another embodiment of the present invention can include a machine readable storage medium having computer usable program code that, when executed, causes a machine to perform the various steps and/or functions described herein.

DETAILED DESCRIPTION OF THE INVENTION

Figure 1:
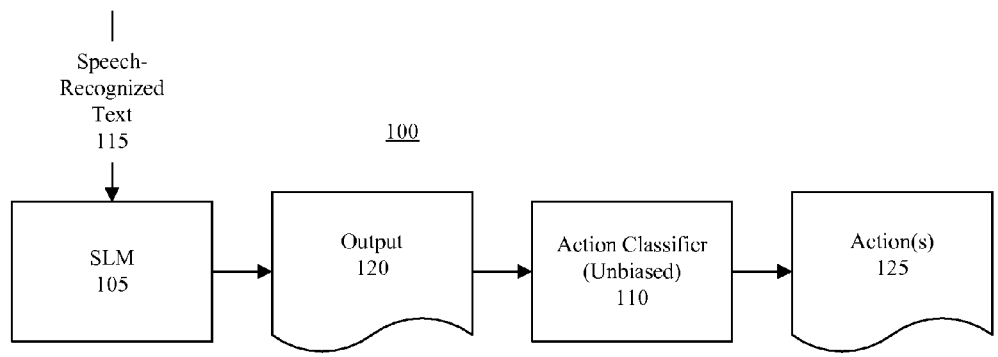
FIG. 1 is a block diagram illustrating a system in accordance with an aspect of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit", "module", or "system".

The invention may also take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. The medium can be, for example, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention relates to removing bias toward an incorrect task from an action classifier within a natural language understanding (NLU) system that may be caused by embedded grammars that have been incorrectly identified. An action classifier can be trained to disambiguate among a plurality of phrases that may contain embedded grammars. Training data, which can be used to train an action classifier, can be created in such a way that bias that is introduced by identification of an incorrect embedded grammar name of phrase tokens contained in overlapping embedded grammars can be reduced or eliminated.

In general, sentences containing overlapping embedded grammars can be split into multiple sentences, with each sentence containing a different name of an embedded grammar that overlaps with the original embedded grammar. By including the generated sentences, as well as the original sentence, in training data for the action classifier, bias introduced by the overlapping embedded grammars can be reduced, if not entirely eliminated. The resulting sentences can be used to train the action classifier.

FIG. 1 is a block diagram illustrating a system 100 in accordance with an aspect of the present invention. The system 100 includes a Statistical Language Model (SLM) 105 and an action classifier 110. Speech-recognized text 115 can be provided to the SLM 105 for processing. The speech-recognized text 115 can be text that is generated during a speech recognition process from a received user voice input. The SLM 105 can process the received speech-recognized text 115 to determine one or more outputs to be provided to the action classifier 110.

The SLM 105 can provide output 120 to the action classifier 110. In one embodiment, the output 120 can include the speech recognized text 115, references to any identified embedded grammars associated with the speech recognized text 115 as determined by the SLM 105, and/or any tokens from such text. That is, the SLM 105 can provide a reference, i.e., a name, of each embedded grammar applicable to the speech-recognized text 115. One or more tokens, in reference to a word that, in some cases, has been determined to convey a particular meaning or context with respect to the speech-recognized text 115, also can be provided as output 120.

In illustration, if the speech-recognized text 115 is "set temperature value at 50", that text can be provided to the action classifier 110 as output 120. In one aspect, an output 120, such as "set temperature value at TEMPERATURE", can be provided to the action classifier 110 which indicates that the embedded grammar TEMPERATURE has been identified as a context for the numerical value "50" from the speech-recognized text 115. Possible tokens that can be identified by the SLM 105 and provided to the action classifier 110 as output 120 can include the word "temperature" from the speech-recognized text 115.

The action classifier 110 can be an "unbiased" action classifier that is trained as will be described in further detail herein. In other words, the action classifier 110 can disambiguate embedded grammars determined by the SLM 105. This can be accomplished by training the action classifier 110 such that any overlapping embedded grammars do not bias the action classifier 110 toward any particular target action or task.

The action classifier 110 can receive the output 120 from the SLM 105. From the output 120, the action classifier 110 can generate a list of one or more actions 125 that the action classifier 110 determines are the likely tasks the user is trying to perform or request, as specified by the original user-spoken utterance from which the speech-recognized text 115 was derived. Possible actions 125 can include, but are not limited to, setting the temperature to a particular level, setting the humidity to a particular level, or the like.

The exemplary actions and/or tasks noted herein are not intended to limit the present invention. Rather, those skilled in the art will appreciate that the range of possible actions will depend upon the particular application in which the system 100 has been trained and is to be used. Accordingly, the action classifier 110 can provide a list of one or more actions 125 as output. The action(s) 125 can be provided to one or more other systems, which can implement the specified action(s) 125, i.e., adjusting the temperature, locking a door, etc.

Figure 2:
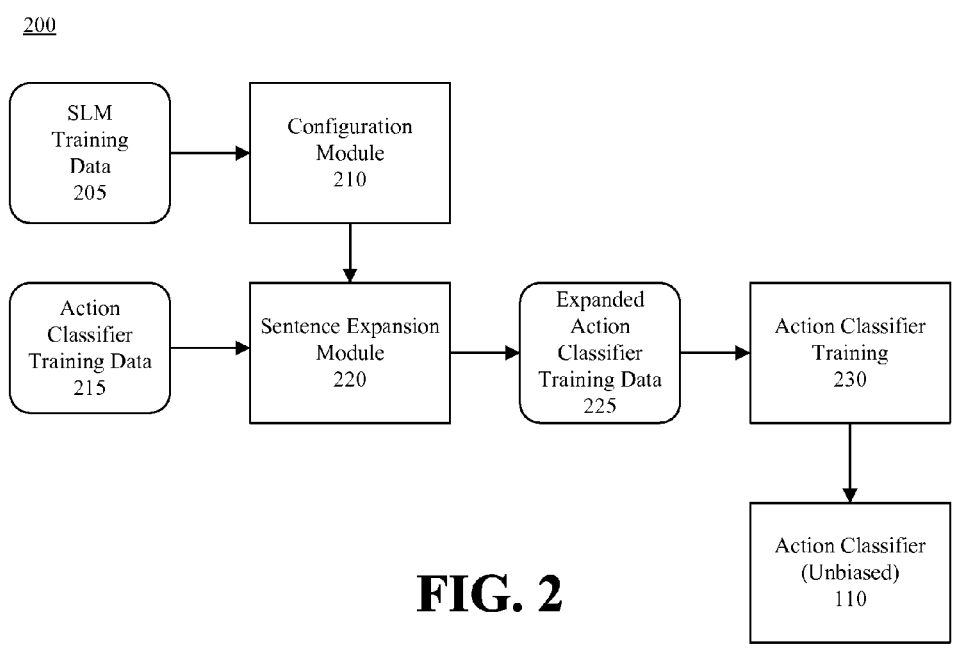
FIG. 2 is a block diagram illustrating a system in accordance with another aspect of the present invention.

FIG. 2 is a block diagram illustrating a system 200 in accordance with another aspect of the present invention. The system 200 can be used to train the action classifier 110 described with reference to FIG. 1. The process of training the action classifier 110 also can be described, or referred to, as creating an action classifier model.

SLM training data 205 can be provided to a configuration module 210. The SLM training data 205 can specify data needed to train the SLM. This data can specify the various embedded grammars that will be used by the SLM in processing text. In one aspect, the configuration module 210 can extract and identify the various embedded grammars that are reference by the SLM training data 205. Once identified, the configuration module 210 can identify those embedded grammars that specify a common value. As noted, an embedded grammar for temperature and an embedded grammar for humidity will likely have one or more values in common. Such embedded grammars can be said to be "overlapping".

The configuration module 210 can represent a configuration tool as well as configuration data generated by the tool. In one aspect, the configuration module 210 can automatically process the embedded grammars specified by the SLM training data 205 to identify those that overlap and place the embedded grammars into groups accordingly. Each embedded grammar in a group of overlapping embedded grammars will have at least one value in common with each other embedded grammar in that group. In that case, for example, the configuration module 210 can display to the user any groups of embedded grammars that share a same value, given a list of embedded grammars. It should be appreciated that each embedded grammar can be categorized into more than one group depending upon the particular values that the embedded grammar has in common with other embedded grammars.

In another arrangement, the configuration module 210 can allow a user to specify groups. For example, the configuration module 210 can present a graphical user interface through which a user can specify which embedded grammars from a list of embedded grammars identified from the SLM training data 205, or provide by the user, should be in groups and the composition of such groups. As noted, embedded grammars that include at least one overlapping value can be placed into a same group. In another embodiment, however, a user can create groups according to which grammars, as determined by the user, have a likelihood of occurring in an ambiguous context.

In another embodiment, given the action classification training data 215, the configuration module 210 can provide a graphical user interface that displays to the user those grammars that share the same value and/or which occur in the same context in the action classifier training data 215. The configuration module 210 can display the groups of embedded grammars and list the contexts shared by the embedded grammar names. Further information such as the number of times such embedded grammars share the same context can be presented as well. In any case, the graphical user interface can allow the user to select one or more groups. Once selected, the groups can be written to a configuration file that can be used by the sentence expansion module 220 in expanding the action classifier training data 215.

The action classifier training data 215 can include a plurality of sentences used to train the action classifier 110, or generate an action classifier model as the case may be. One or more of the sentences of the action classifier training data 215 can include references to overlapping embedded grammars. The action classifier training data 215 can be provided to the sentence expansion module 220. The sentence expansion module 220 can expand the action classifier training data 215 to create expanded action classifier training data 225.

The sentence expansion module 220 can identify each of the sentences of the action classifier training data 215 that includes an overlapping embedded grammar. Each sentence can be replicated, or copied, and the overlapping embedded grammar within the sentence can be replaced with another, different, overlapping embedded grammar from the group that contained the original overlapping embedded grammar.

As noted, the groups can be specified within the configuration module 210. The original sentence, with the original overlapping embedded grammar, can be retained within the action classifier training data 215 and/or included in the expanded action classifier training data 225. The sentence expansion module 220 can include each newly generated sentence in the expanded action classifier training data 225.

Block 230 represents the training process to which the action classifier 110 is subjected. The training process of block 230 utilizes the expanded action classifier training data 225. The action classifier 110 is trained on each of the embedded grammars in the confusable group to prevent any bias in the action classifier 110 that may otherwise be introduced by the overlapping embedded grammars.

Figure 3:
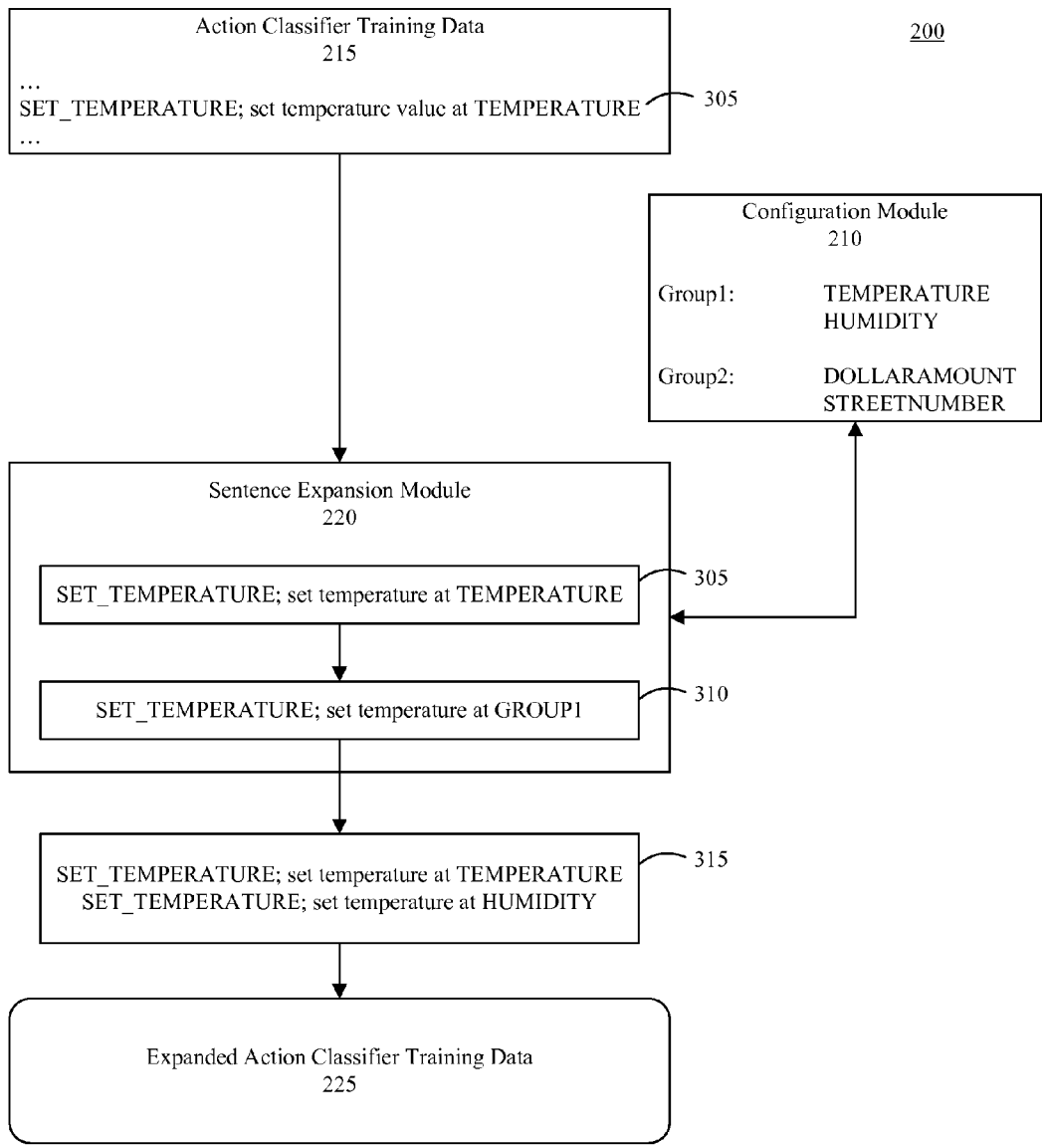
FIG. 3 is a block diagram illustrating another aspect of the system of FIG. 2.

FIG. 3 is a block diagram illustrating another aspect of the system of FIG. 2. As shown, the action classifier training data 215 includes a sentence 305 "set temperature value at TEMPERATURE". As used herein, the term "sentence" can refer to a complete grammatical sentence, a phrase of a plurality of words and/or symbols, as well as a collection of one or more words and/or symbols. The sentence 305 has been associated with the action "SET_TEMPERATURE". The sentence expansion module 220 can identify sentence 305 as one that includes an overlapping embedded grammar, in this case TEMPERATURE. As shown in the configuration module 210, the embedded grammar TEMPERATURE and the embedded grammar HUMIDITY are both included in Group1 since each shares at least one common value.

The sentence expansion module 220 begins expanding the sentence 305 into sentence 310, and eventually into the sentence expansion 315. The sentence 305 can be split into the same number of sentences as members of Group1. Thus, the sentence 305 "set the temperature value at TEMPERATURE", is split to create the following sentence expansion 315:

Set the temperature at TEMPERATURE.
Set the temperature at HUMIDITY.

The original sentence can be retained and a copy of the original sentence is added where the TEMPERATURE embedded grammar is replaced by the other member of the group HUMIDITY. The sentence expansion 315, which includes the original sentence and all copies, can be added to the expanded action classifier training data 225.

The sentence expansion 315 can include each of the embedded grammar names that overlap the embedded grammar name found in the original sentence 305. This process can reduce and/or eliminate bias created by the embedded grammar names from the process of action determination at runtime. The resulting sentences, i.e., the expanded action classifier training data 225, can be used to train the action classifier 110.

In another example, if more than one overlapping embedded grammar name is encountered in a sentence, the expansion can be performed on all possible combinations of the overlapping, embedded grammar name in the group. Consider the sentence "set the temperature value to TEMPERATURE and then set it to TEMPERATURE". This sentence can be split into the following sentence expansion:

Set the temperature value to TEMPERATURE and then set it to TEMPERATURE.
Set the temperature value to TEMPERATURE and then set it to HUMIDITY.
Set the temperature value to HUMIDITY and then set it to TEMPERATURE.
Set the temperature value to HUMIDITY and then set it to HUMIDITY.

Figure 4:
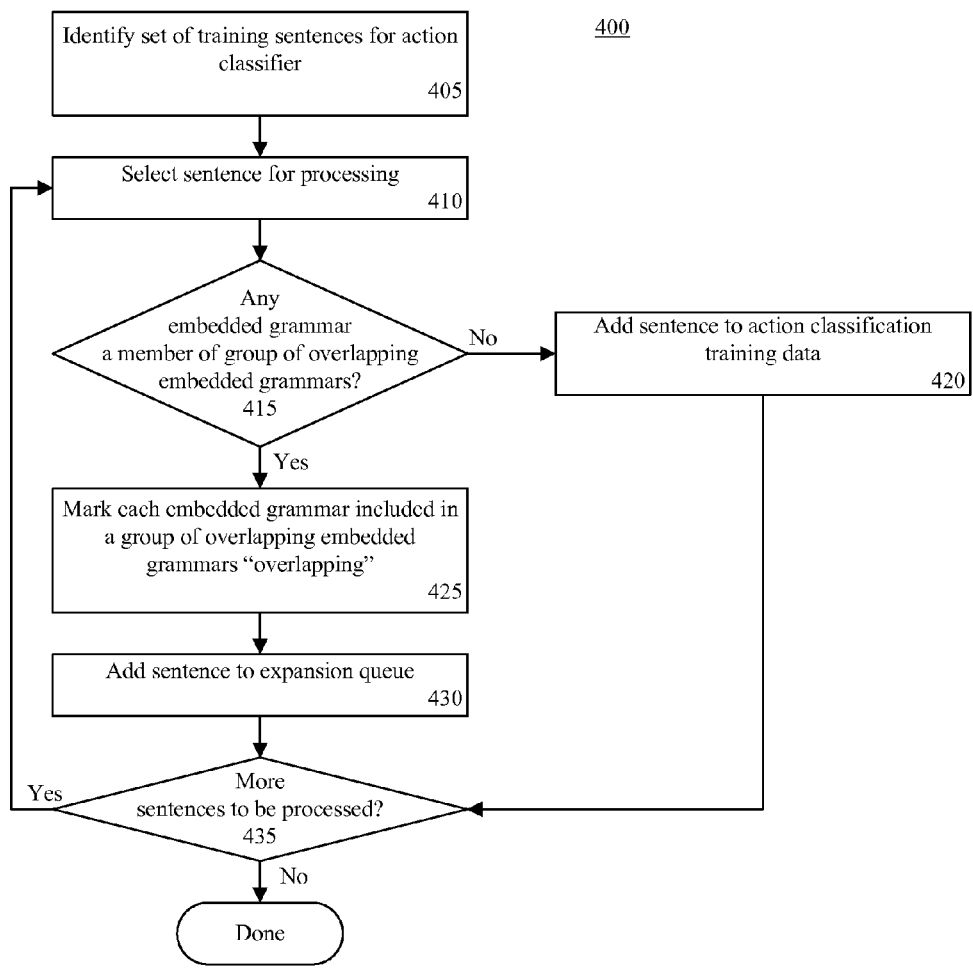
FIG. 4 is a flow chart illustrating a method in accordance with an aspect of the present invention.

FIG. 4 is a flow chart illustrating a method 400 in accordance with an aspect of the present invention. The method 400 can be performed by a system such as the system illustrated with reference to FIG. 2. The method 400 can begin in step 405 where the sentence expansion module can identify a set of sentences to be processed for creating action classifier training data. In one embodiment, the set of sentences can be unexpanded action classifier training data. That is, different ones of the sentences from the set that have not been expanded can include one or more overlapping embedded grammars. Further, the sentences can be associated with a particular action.

In step 410, the sentence expansion module can select a sentence from the set of sentences for processing. In step 415, the sentence expansion module can determine whether the selected sentence includes any embedded grammar that is a member of one of the groups of overlapping embedded grammars defined by the configuration module. If so, the method can proceed to step 425. If not, the method can continue to step 420, where the selected sentence is added to the action classification training data, or an expanded action classification training data. Since the sentence includes no overlapping embedded grammars, no expansion need be performed.

Continuing with step 425, each grammar within the sentence that is included in a group of overlapping grammars, as specified by the configuration module, can be marked "overlapping". In step 430, the sentence can be added to an expansion queue for further processing. After either of steps 420 or 430, the method proceed to step 435 to determine whether any further sentences of the set have yet to be processed. If so, the method can loop back to step 410 to continue processing until such time that no further sentences of the set remain to be processed. If no further sentences remain to be processed, the method can end.

Figure 5:
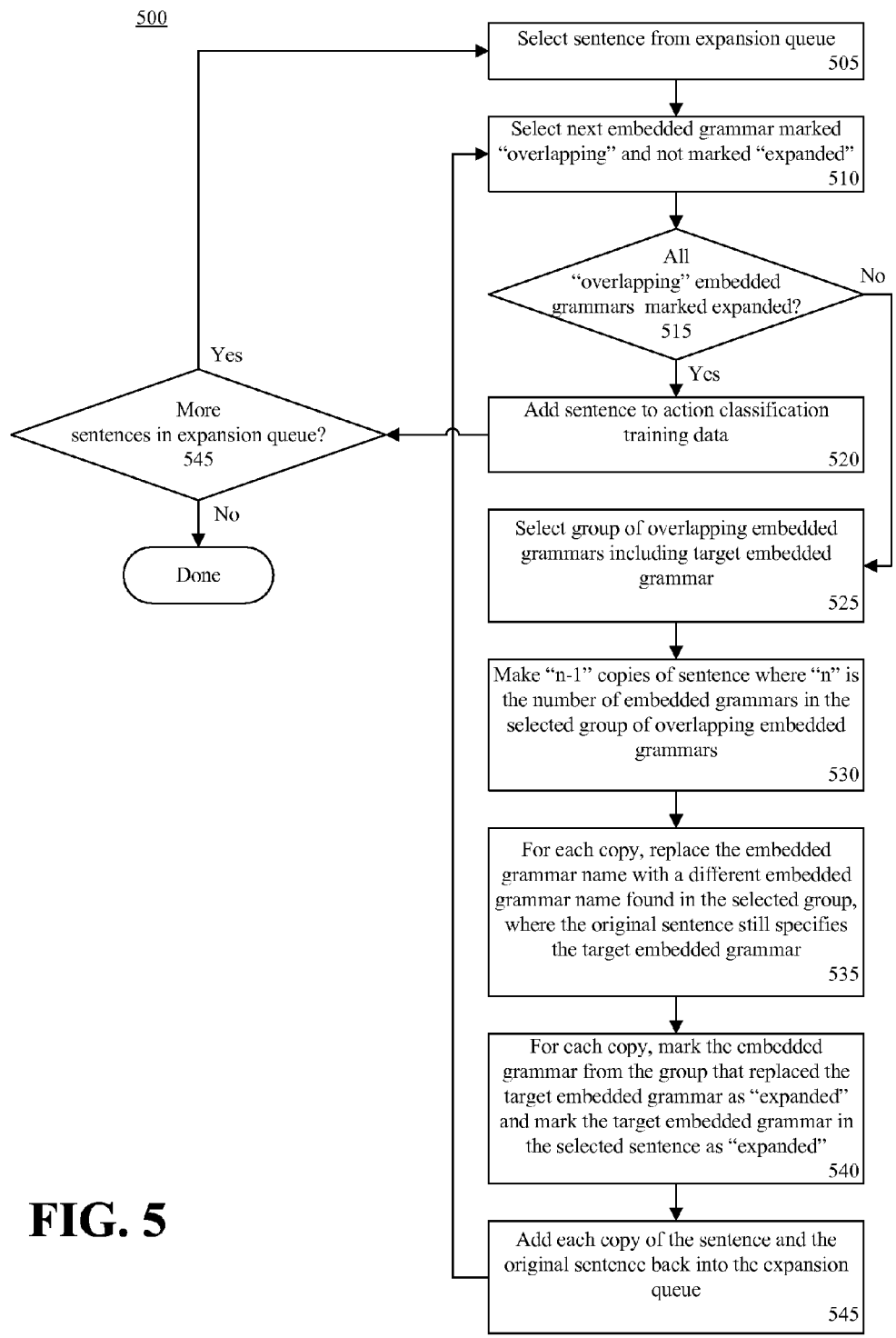
FIG. 5 is a flow chart illustrating a method in accordance with another aspect of the present invention.

FIG. 5 is a flow chart illustrating a method 500 in accordance with another aspect of the present invention. The method 500 illustrates one manner in which sentences can be expanded after being identified by the sentence expansion module discussed with reference to FIG. 4. It should be appreciated that while FIGS. 4 and 5 are depicted as being separate processes, that the two methods can be performed concurrently if so desired. The method 500 can begin in step 505, where the sentence expansion module can select a sentence from the expansion queue for processing.

In step 510, an embedded grammar, or next embedded grammar, within the sentence that has been marked "overlapping", but which has not been marked "expanded", can be selected. The selected embedded grammar also can be referred to as the "target embedded grammar". In step 515, the sentence expansion module can determine whether all of the embedded grammars of the selected sentence which were marked "overlapping" have been expanded. If so, the method can proceed to step 520 where the sentence can be added to the action classification training data, or expanded action classification training data as the case may be. After step 520, the method can proceed to step 545 where the sentence expansion module can determine whether more sentences remain in the expansion queue to be processed. If so, the method can loop back to step 505 to select a next sentence. Otherwise, the method can end.

If the sentence includes embedded grammars that were marked as "overlapping", but which have not yet been marked "expanded", the method can proceed to step 525. In step 525, a group of overlapping embedded grammars that includes the target embedded grammar can be selected. The selected group can be said to be associated with the target embedded grammar. In step 530, "n−1" copies of the sentence can be made. The value of "n" can be the total number of embedded grammars within the selected group of overlapping embedded grammars. For example, if the group includes a total of 5 members, inclusive of the target embedded grammar, then 4 copies of the sentence can be created. The four copies, along with the original sentence including the target embedded grammar, can form a sentence expansion of 5 sentences.

In step 535, for each copy of the sentence, the name of the target embedded grammar can be replaced with a different embedded grammar name from the selected group of overlapping embedded grammars. The original sentence, which still specifies the target embedded grammar can remain unchanged or intact. In step 540, for each copy of the sentence, the embedded grammar from the group that replaced the target embedded grammar can be marked or annotated as "expanded" to indicate that the copy of the sentence has been expanded with respect to the target embedded grammar. The target embedded grammar in the original sentence also can be marked expanded.

In step 545, each copy of the sentence and the original sentence can be added back into the expansion queue for further processing until all embedded grammars that have been marked as "overlapping" have been marked "expanded".

Once the action classifier data training data is determined, or expanded, that data can be used to train the action classifier. The action classifier can be trained using any of a variety of known techniques, so long as the action classifier training data is expanded as described herein. Examples of training techniques that can be used can include, but are not limited to, naïve Bayes, maximum entropy, and various rule learning algorithms. In any case, the particular technique that is used to train the action classifier is not intended to be a limitation of the present invention.

At runtime, an action classifier trained using the expanded training data described herein can function as follows. If a sentence such as "I'd like the temperature set at 75" is received, the SLM may misinterpret the sentence and provide "I'd like the temperature set at HUMIDITY" as output to the action classifier. At this point, the action classifier will have been trained equally with HUMIDITY and TEMPERATURE with regard to the "SET_TEMPERATURE" action. Any features, i.e., inputs or phrases, provided to the action classifier including the token "HUMIDITY" will not bias the action classifier toward the target action "SET_HUMIDITY". Instead, the token "temperature" will correctly bias the action classifier toward the action "SET_TEMPERATURE".

In one aspect, the sentence expansion module can optionally set or alter the count of any split or expanded sentence according to the target embedded grammar and/or the particular embedded grammar of a group that is used to replace the target embedded grammar. For example, sentences that have been expanded to include the embedded grammar "TEMPERATURE" can be adjusted to have a higher count within the action classifier training data.

In one embodiment, a user can specify a multiplier for one or more names in a group of overlapping embedded grammars. This instruction and multiplier, for example, can be specified via the configuration module. The sentence expansion module can multiply the existing count of the sentence by the value that corresponds to the embedded grammar from the group of overlapping embedded grammars that is used to replace the target embedded grammar within the sentence of a sentence expansion. For example, within a sentence expansion, an embedded grammar C can replace the target embedded grammar A. The count of the sentence of the sentence expansion now including embedded grammar C can be multiplied by a parameter that is associated with embedded grammar C. This parameter can be specified in the group within which the embedded grammar C is a member.

It should be appreciated that in another embodiment, the count of a sentence can be modified by a factor that is dependent upon the target embedded grammar that is being replaced. Such would also be the case with respect to the originally selected sentence that includes the target embedded grammar as the target embedded grammar remains in that sentence within the action classifier training data. It should be appreciated that the count of a sentence can reflect the relative weight of that sentence within the plurality of sentences, i.e., the training data. For instance, a sentence with a count of 2 will have twice as much weight as a sentence with a count of 1. As the count reflects the weight of the sentence within the training data, the actual weight and influence of a sentence with respect to the operation of the action classification model will depend upon the training method that is used.

In another aspect, a user can specify, for instance, through the configuration module, one or more selected actions for which sentence expansion will be performed. For example, it may be the case that the user determines that the SLM is most likely to incorrectly interchange the TEMPERATURE and HUMIDITY embedded grammars when the intended action is "SET_TEMPERATURE". The user further can determine that such errors are less likely, or not likely, to occur when the intended task is "GET_TEMPERATURE". Accordingly, through the configuration module, the user can specify that only sentences associated with the action "SET_TEMPERATURE" are to be expanded.

The present invention provides a method, system, and apparatus directed at removing bias from an action classifier of an NLU system. By creating training data that expands the sentences that include overlapping embedded grammars, the bias introduced from the overlapping embedded grammars can be reduced or eliminated. This expanded training data can be used to train the action classifier. Once trained, the action classifier can more accurately determine user-intended actions despite potential SLM errors in identifying embedded grammars.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A method for use with an action classifier within a natural language understanding system, the method comprising:
    identifying a sentence having a target embedded grammar that overlaps with one or more other embedded grammars;
    selecting a group of overlapping embedded grammars comprising the target embedded grammar and at least one additional embedded grammar of the one or more other embedded grammars;
    creating, using at least one computer, a sentence expansion comprising the sentence including the target embedded grammar and a copy of the sentence for each additional embedded grammar of the group, with each copy of the sentence including a different additional embedded grammar from the group in place of the target embedded grammar; and
    including the sentence expansion in action classifier training data suitable for training the action classifier of the natural language understanding system.

2. The method of claim 1, further comprising training the action classifier of the natural language understanding system with the action classifier training data comprising the sentence expansion.

3. The method of claim 1, further comprising defining the group of overlapping embedded grammars as a set of embedded grammars having at least one value in common.

4. The method of claim 1, further comprising receiving a user input defining the group of overlapping embedded grammars.

5. The method of claim 1, wherein creating a sentence expansion further comprises:
    creating n−1 copies of the sentence, where n is the total number of embedded grammars in the selected group; and
    replacing the target embedded grammar in each copy of the sentence with a different one of the additional embedded grammars of the group, wherein the original sentence comprising the target embedded grammar remains intact.

6. The method of claim 1, further comprising automatically setting a count of a sentence according to the target embedded grammar or the embedded grammar used to replace the target embedded grammar in the sentence.

7. The method of claim 1, further comprising:
    determining whether the sentence is associated with a selected action; and
    only creating a sentence expansion if the sentence is associated with the selected action.

8. A method for use with an action classifier within a natural language understanding system, the method comprising:
    identifying sentences that comprise at least one target embedded grammar; and
    for each identified sentence,
        selecting a group of overlapping embedded grammars including the target embedded grammar and at least one additional embedded grammar,
        creating n−1 copies of the sentence, where n is the total number of embedded grammars in the selected group,
        replacing, using at least one computer, the target embedded grammar in each copy of the sentence with a different one of the additional embedded grammars of the group and keeping the original sentence comprising the target embedded grammar intact, and
        including the sentence and the copies of the sentence within action classifier training data suitable for training the action classifier of the natural language understanding system.

9. The method of claim 8, further comprising training the action classifier of the natural language understanding system with the action classifier training data comprising the sentence and the copies of the sentence.

10. The method of claim 8, further comprising automatically setting a count of a sentence according to the target embedded grammar or the additional embedded grammar used to replace the target embedded grammar.

11. The method of claim 8, further comprising:
    determining whether the sentences are associated with selected actions; and
    only performing the selecting, creating, and replacing steps for sentences associated with the selected actions.

12. The method of claim 8, further comprising defining the group of overlapping embedded grammars as a set of embedded grammars having at least one value in common.

13. The method of claim 8, further comprising receiving a user input defining the group of overlapping embedded grammars.

14. The method of claim 8, further comprising determining that the target embedded grammar includes a value that is common to at least one other embedded grammar in the natural language understanding system.

15. A computer program product comprising:
    a non-transitory computer readable storage medium having computer usable program code for use with an action classifier within a natural language understanding system, said computer usable program code including:
    computer usable program code that identifies a sentence having a target embedded grammar that overlaps with one or more other embedded grammars;
    computer usable program code that selects a group of overlapping embedded grammars comprising the target embedded grammar and at least one additional embedded grammar of the one or more other embedded grammars;
    computer usable program code that creates a sentence expansion comprising the sentence including the target embedded grammar and a copy of the sentence for each additional embedded grammar of the group, with each copy of the sentence including a different additional embedded grammar from the group in place of the target embedded grammar; and computer usable program code that adds the sentence expansion to action classifier training data suitable for training the action classifier of the natural language understanding system.

16. The computer program product of claim 15, wherein the computer usable program code further comprises computer usable program code that trains the action classifier of the natural language understanding system with the action classifier training data comprising the sentence expansion.

17. The computer program product of claim 15, wherein the computer usable program code further comprises computer usable program code that defines the group of overlapping embedded grammars as a set of embedded grammars having at least one value in common.

18. The computer program product of claim 15, wherein the computer usable program code further comprises computer usable program code that receives a user input defining the group of overlapping embedded grammars.

19. The computer program product of claim 15, wherein the computer usable program code further comprises computer usable program code that automatically sets a count of a sentence according to the target embedded grammar or the additional embedded grammar used to replace the target embedded grammar.

20. The computer program product of claim 15, wherein the computer usable program code further comprises:

computer usable program code that determines whether the sentence is associated with a selected action; and computer usable program code that only creates a sentence expansion if the sentence is associated with the selected action.

21. The method of claim 1, wherein the at least one additional embedded grammar biases the action classifier toward a different action than the target embedded grammar does.

* * * * *